（12）United States Patent
Ishikawa et al.

(10) Patent No.: US 12,005,511 B2
(45) Date of Patent: Jun. 11, 2024

(54) MACHINE TOOL

(71) Applicant: STAR MICRONICS CO., LTD., Shizuoka (JP)

(72) Inventors: Takayuki Ishikawa, Shizuoka (JP); Hiroyuki Ogasawara, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 63 days.

(21) Appl. No.: 17/827,445

(22) Filed: May 27, 2022

(65) Prior Publication Data

US 2022/0379386 A1  Dec. 1, 2022

(30) Foreign Application Priority Data

May 28, 2021 (JP) ................................. 2021-089946

(51) Int. Cl.
| | | |
|---|---|---|
| *B23B 29/32* | (2006.01) | |
| *B23B 13/02* | (2006.01) | |
| *B23B 27/06* | (2006.01) | |
| *B23Q 39/00* | (2006.01) | |
| *B23Q 39/02* | (2006.01) | |

(52) U.S. Cl.
CPC ............ *B23B 29/326* (2013.01); *B23B 13/02* (2013.01); *B23B 27/065* (2013.01); *B23Q 2039/008* (2013.01); *B23Q 39/027* (2013.01)

(58) Field of Classification Search
CPC  B23B 3/16; B23B 3/164; B23B 3/165; B23B 29/24; B23B 29/242; B23B 29/248; B23B 29/28; B23B 29/26; B23B 29/32; B23B 29/323; B23B 29/326; B23Q 16/00

See application file for complete search history.

(56) References Cited

U.S. PATENT DOCUMENTS

| | | | | |
|---|---|---|---|---|
| 3,725,987 | A | * | 4/1973 | Kurimoto ............... B23B 3/164 29/27 C |
| 3,786,539 | A | * | 1/1974 | Foll ........................ B23Q 39/02 29/27 R |
| 4,180,894 | A | * | 1/1980 | Link ....................... B23B 3/161 408/35 |
| 4,327,612 | A | * | 5/1982 | Bazuin ................... B23Q 16/02 82/120 |

(Continued)

FOREIGN PATENT DOCUMENTS

| | | | | |
|---|---|---|---|---|
| DE | 3834342 A | * | 4/1990 | ............. B23B 3/164 |
| DE | 10213778 A1 | | 10/2003 | |

(Continued)

*Primary Examiner* — Nicole N Ramos
(74) *Attorney, Agent, or Firm* — Muncy, Geissler, Olds & Lowe, P.C.

(57) ABSTRACT

A machine tool includes a spindle capable of holding a workpiece and rotatable on a spindle axis and a tool post on which a tool is attachable to machine the workpiece held by the spindle. The tool post includes a first turnable holder turnable on a first turning axis perpendicular to the spindle axis. The first turnable holder has a first tool unit mounting part where a rotary tool is attachable. The tool post further includes a second turnable holder turnable on a second turning axis perpendicular to the spindle axis and different from the first turning axis. The second turnable holder has a second whirling tool mounting part where a thread whirling tool is attachable.

8 Claims, 7 Drawing Sheets

(56) References Cited

U.S. PATENT DOCUMENTS

| | | | | |
|---|---|---|---|---|
| 4,597,144 | A | * | 7/1986 | Frank .................... B23Q 1/5481 |
| | | | | 408/40 |
| 4,597,155 | A | * | 7/1986 | Garnett ................. B23Q 7/045 |
| | | | | 408/35 |
| 5,885,199 | A | | 3/1999 | Shao |
| 6,128,812 | A | * | 10/2000 | Link ..................... B23B 29/242 |
| | | | | 82/159 |
| 7,249,545 | B2 | * | 7/2007 | Shinohara ............ B23Q 39/048 |
| | | | | 82/1.11 |
| 9,724,760 | B2 | * | 8/2017 | Kawasumi ............. B23B 3/167 |
| 10,099,293 | B2 | * | 10/2018 | Theurillat ............... B23B 3/065 |
| 2001/0032532 | A1 | * | 10/2001 | Hafla ................. B23Q 11/0032 |
| | | | | 82/121 |
| 2002/0170396 | A1 | * | 11/2002 | Maier .................... B23B 3/164 |
| | | | | 82/159 |
| 2007/0209179 | A1 | * | 9/2007 | Williams .............. B23F 21/005 |
| | | | | 29/27 C |
| 2009/0082184 | A1 | | 3/2009 | Grossmann |
| 2015/0111479 | A1 | | 4/2015 | Barensteiner et al. |
| 2017/0072473 | A1 | | 3/2017 | Kawasumi |

FOREIGN PATENT DOCUMENTS

| | | |
|---|---|---|
| DE | 102005011306 A1 | 9/2006 |
| DE | 102006026186 A1 | 12/2007 |
| JP | 2014037043 A | 2/2014 |
| JP | 2019198909 A | 11/2019 |
| WO | WO-2013/178625 A1 | 12/2013 |

\* cited by examiner

MACHINE TOOL

CROSS-REFERENCE TO RELATED APPLICATIONS

This application claims priority of Japanese Patent Application No. 2021-089946 filed on May 28, 2021. The contents of this application are incorporated herein by reference in their entirety.

BACKGROUND OF THE INVENTION

The present invention relates to a machine tool including a spindle capable of holding a workpiece and rotatable on a spindle axis and further including a tool post.

A well-known lathe includes a spindle capable of holding a workpiece and rotatable on a spindle axis and further includes a tool post where a tool is attachable to machine a workpiece held by the spindle. See Japanese Unexamined Patent Application Publication No. 2014-037043. The tool post includes a turnable holder and a stationary holder each having a tool mounting part where the tool is attachable. The turnable holder turns on a turning axis extended along a Y-axis direction perpendicular to the spindle axis. The turnable holder provides a variety of operations by adjusting the direction of the tool with respect to the workpiece.

Another well-known lathe further includes an opposite spindle facing the spindle and an opposite tool post where the tool is attachable to machine the workpiece held by the opposite spindle. See Japanese Unexamined Patent Application Publication No. 2019-198909. The tool post and the opposite tool post each includes a turnable holder and a stationary holder. The turnable holder is turnable on a turning axis perpendicular to the spindle axis. The turnable holder on the opposite tool post provides a variety of operations on the workpiece held by the opposite spindle as the turnable holder on the tool post do on the workpiece held by the spindle.

SUMMARY

There is an increasing need for a machine tool capable of increasing a variety of operations on a workpiece held by a spindle. A limitation on the number and kind of the tools attachable to the turnable holder only provides a limited variety of operations directing a cutting edge in a desired direction in a conventional machine tool as disclosed in Japanese Unexamined Patent Application Publications Nos. 2014-037043 and 2019-198909. A larger turnable holder having a larger number of tool mounting parts where a larger number of tools are attachable would increase the variety of operations. Such larger turnable holder, however, would occupy a larger turning space and thereby increase the size of the machine.

The present invention provides a compact machine tool capable of providing a variety of machining operations.

A machine tool of the invention includes a spindle capable of holding a workpiece and rotatable on a spindle axis and a tool post on which a tool is attachable to machine the workpiece held by the spindle. The tool post includes a first turnable holder turnable on a first turning axis perpendicular to the spindle axis. The first turnable holder has a first tool mounting part where the tool is attachable. The tool post further includes a second turnable holder turnable on a second turning axis perpendicular to the spindle axis and different from the first turning axis. The second turnable holder has a second tool mounting part where the tool is attachable.

The tool post may include the first turnable holder and the second turnable holder. Such configuration provides a variety of operations and also saves a turning space compared to a single turnable holder, thus reducing the machine tool in size.

The tool post may be movable in a first axis direction along the first turning axis. The tool post may be movable in a third axis direction perpendicular to the first axis direction and also perpendicular to a second axis direction along the spindle axis. The second turning axis may be distant from the first turning axis in the third axis direction and may be parallel to the first turning axis. The first turnable holder may hold a rotary tool. The second turnable holder may hold a rotary tool. The first turnable holder and the second turnable holder may be arranged on opposite sides of the workpiece. The first turnable holder and the second turnable holder each may turn to adjust the direction of the tool with respect to the workpiece. The machine tool may further include a turnable base where the first turnable holder and the second turnable holder may be turnably mounted.

The machine tool may further include a motor configured to commonly drive the first turnable holder and the second turnable holder.

Such configuration reduces the machine tool in cost.

The machine tool may further include a brake configured to maintain the second turnable holder at a predetermined turning angle by which the second turnable holder has turned.

The brake can keep the turning angle of the second turnable holder regardless of any load applied in the turning direction, thus providing higher machining accuracy.

A thread whirling tool may be attachable to the first turnable holder and the second turnable holder each.

The first turnable holder and the second turnable holder each may be configured to hold the thread whirling tool, thus providing a variety of thread whirling operations applicable on the workpiece held by the spindle such as a single-start thread, a double-start thread, and two different threads of different ridges.

The invention can provide a compact machine tool capable of providing a variety of machining operations.

DETAILED DESCRIPTION

Figure 1:
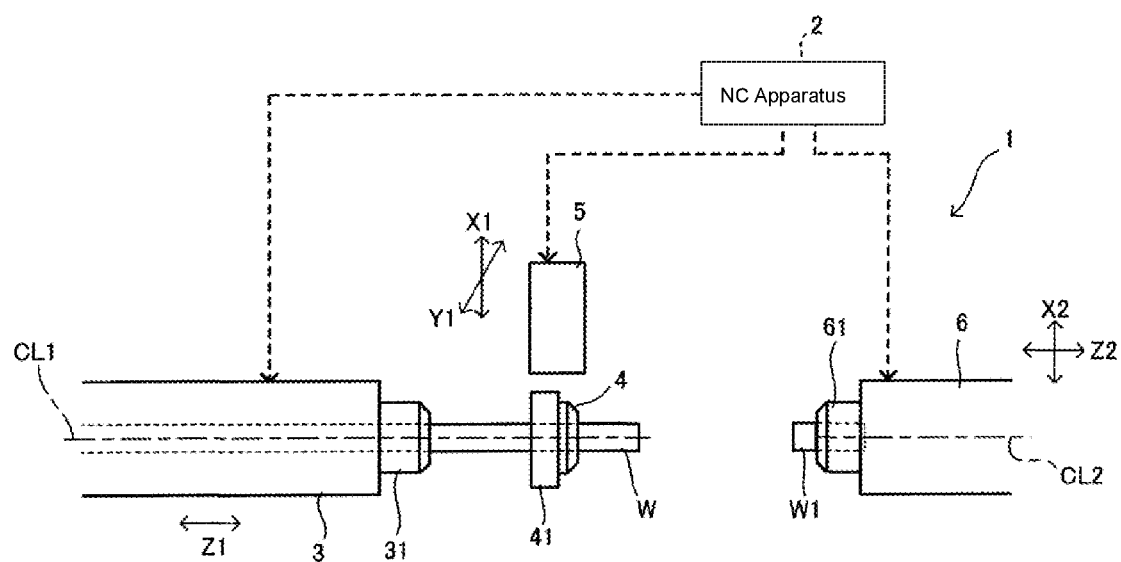
FIG. 1 is a plan view schematically showing an internal configuration of an NC lathe of an embodiment.

Hereinafter, an embodiment of the present invention will be described referring to the drawings. The invention embodied in an NC (Numerical Control) lathe is being described.

FIG. 1 is a plan view schematically showing an internal configuration of the NC lathe of the embodiment.

The NC lathe 1 may include a control apparatus 2, a headstock 3, a guide bush 4, a tool post 5, and an opposite headstock 6. The NC lathe 1 may be an example of the machine tool. The control apparatus 2 may store an NC program and operation information corresponding to a command used in the NC program. The control apparatus 2 may be a computer capable of controlling the headstock 3, the tool post 5, the opposite headstock 6 in accordance with the NC program. The control apparatus 2 may control rotation of a spindle 31 and an opposite spindle 61. The control apparatus 2 may control rotation of a rotary tool attached to the tool post 5.

The headstock 3 may hold the spindle 31 mounted thereon. The headstock 3 with the spindle 31 thereon may be movable in a Z1-axis direction. The Z1-axis direction may be a horizontal direction, which is a right-left direction in FIG. 1. The Z1-axis direction may be an example of the second axis direction. The spindle 31 may include a chuck such as a collet. A bar workpiece W may be inserted into the spindle 31. The spindle 31 may releasably hold the workpiece W with the chuck. The spindle 31 holding the workpiece W may be rotatable on a spindle axis CL1. The direction of the spindle axis CL1 may match with the Z1-axis direction. The spindle 31 may be connected to a not-shown spindle motor such as a built-in motor. The spindle 31 may be driven by the motor in response to a command from the control apparatus 2. The workpiece W held by the spindle 31 may be thereby rotatable on the spindle axis CL1.

The guide bush 4 may be secured to a guide bush supporting bed 41 on a base of the NC lathe 1. The guide bush 4 may slidably support the end of the workpiece W inserted through the spindle 31. The workpiece W may be thereby slidable in the Z1-axis direction. Part of the guide bush 4 that supports the workpiece W may be rotatable on the spindle axis CL1 synchronously with the spindle 31. The spindle axis CL1 may be a rotational axis of the workpiece W supported by the guide bush 4. The guide bush 4 can suppress a bend of the workpiece W during machining, thus providing higher accuracy especially for a longer workpiece.

The tool post 5 may be movable in a horizontal X1-axis direction perpendicular to the spindle axis CL1 and in a vertical Y1-axis direction perpendicular to the spindle axis CL1. The up-down direction of FIG. 1 may be the X1-axis direction and a direction perpendicular to paper may be the Y1-axis direction. The Y1-axis direction may be an example of the first axis direction. The X1-axis direction may be an example of the third axis direction. The tool post 5 may hold the tool capable of machining the workpiece W. The tool post 5 is being described later.

The opposite headstock 6 may hold the opposite spindle 61 mounted thereon. The opposite headstock 6 with the opposite spindle 61 thereon may be movable in an X2-axis direction and in a Z2-axis direction. The X2-axis direction may be the same as the X1-axis direction. The Z2-axis direction may be the same as the Z1-axis direction. FIG. 1 shows that the opposite spindle 61 and the spindle 31 are arranged on opposite sides of the guide bush 4. An opposite spindle axis CL2 of the opposite spindle 61 may be on the same line as the spindle axis CL1. The direction of the opposite spindle axis CL2 may match with the Z2-axis direction. The workpiece W may be machined with the spindle 31 and cut off with a cut-off tool into a cut-off workpiece W1 to be delivered to the opposite spindle 61. The opposite spindle 61 may include a chuck such as a collet. The opposite headstock 6 may be connected to a spindle motor such as a built-in motor. The opposite spindle 61 may be driven by the motor in response to a command from the control apparatus 2. The cut-off workpiece W1 held by the opposite spindle 61 may be thereby rotatable on the second spindle axis CL2.

Figure 2:
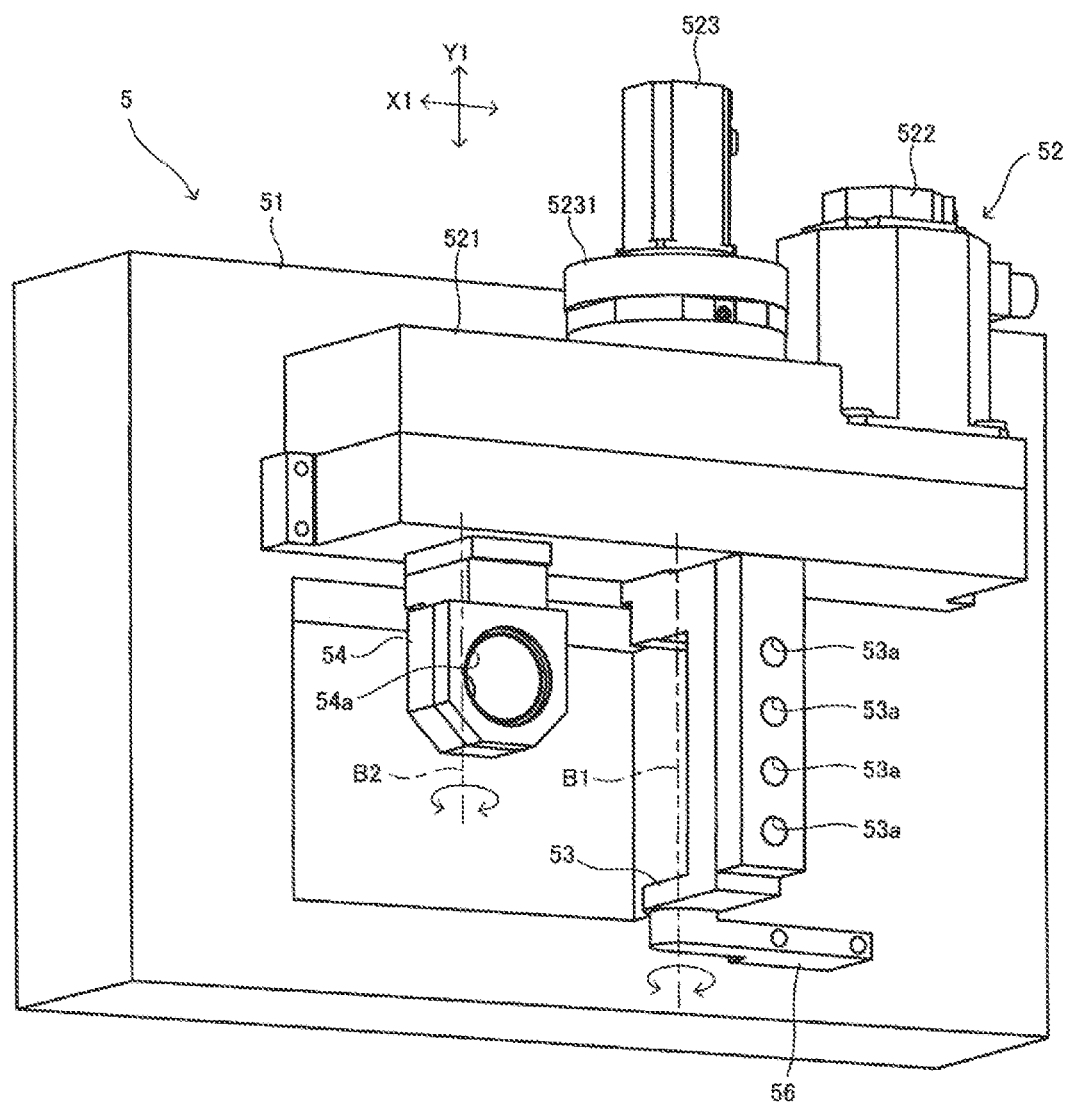
FIG. 2 is a perspective view of a tool post of the NC lathe.

FIG. 2 is a perspective view of the tool post of the NC lathe.

The tool post 5 may include a movable table 51, a turnable base 52, a first turnable holder 53, a second turnable holder 54, and a first bottom support 56. The movable table 51 may move in the X1-axis and the Y1-axis directions. A not-shown X1-axis motor may drive the movable table 51 in the X1-axis direction under control of the control apparatus 2. A not-shown Y1-axis motor may drive the movable table 51 in the Y1-axis direction under control of the control apparatus 2.

The turnable base 52 may include a base body 521, a tool rotating motor 522, and a turning motor 523. The base body 521 may be fastened to the movable table 51 with screws. The tool rotating motor 522 and the turning motor 523 may be secured to the base body 521. The tool rotating motor 522 and the turning motor 523 may be servo motors. The turning motor 523 may be an example of the motor. The turning motor 523 may include a reducer 5231. The base body 521 may internally include a not-shown rotary drive transmission mechanism capable of transmitting driving force of the tool rotating motor 522. The rotary drive transmission mechanism may include a gear mechanism. Driving force of the tool rotating motor 522 may be transmitted to a tool rotating mechanism on the first turnable holder 53 and the second turnable holder 54 each. The base body 521 may further internally include a turning drive transmission mechanism 55 (FIG. 3) capable of transmitting driving force of the turning motor 523 to the first turnable holder 53 and the second turnable holder 54. The turning drive transmission mechanism 55 is being described later.

The first bottom support 56 may be below the base body 521 and fastened to the movable table 51 with screws. The first bottom support 56 may support the bottom end of the first turnable holder 53. The first bottom support 56 may be excluded. Providing the first bottom support 56, however, provides a rigid support for the first turnable holder 53. This prevents deformation of the first turnable holder 53, thus improving machining accuracy.

Figure 3:
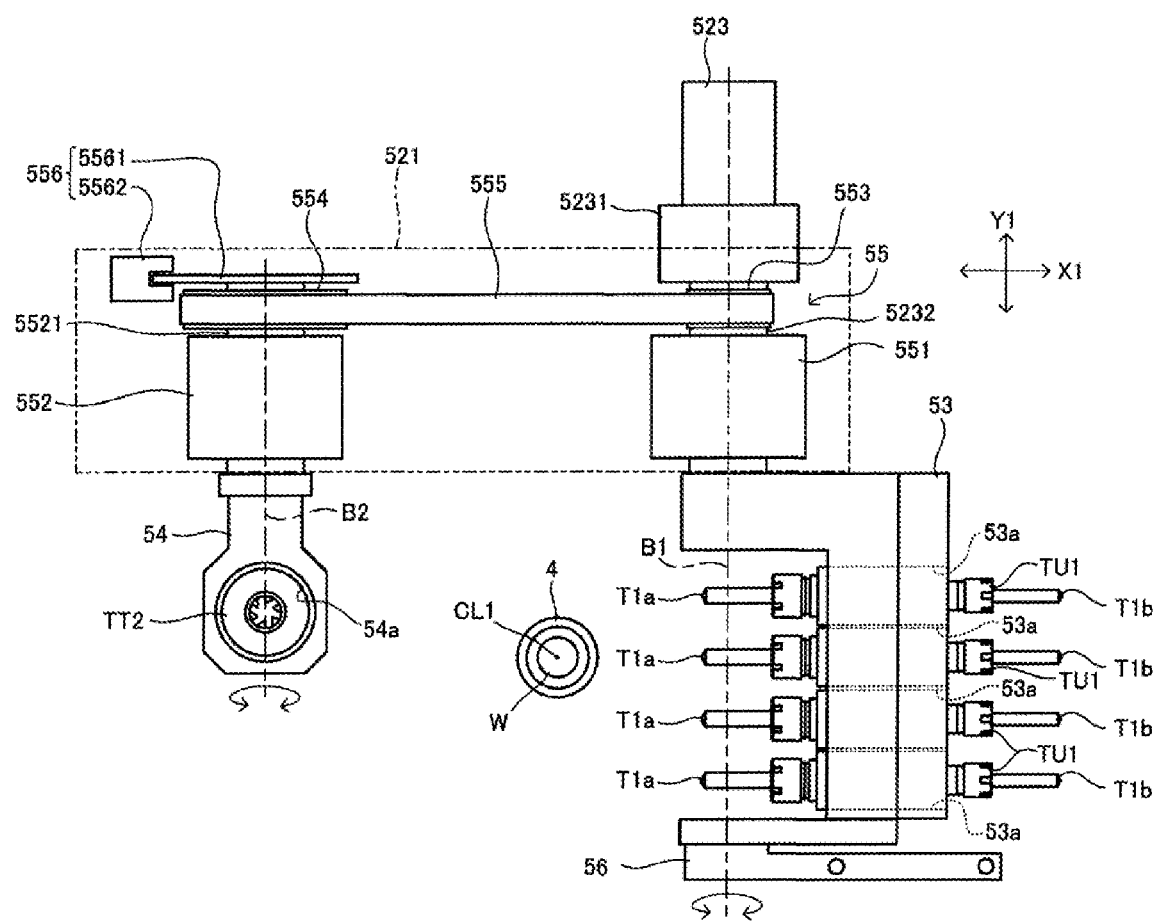
FIG. 3 is a right side view of a turning drive transmission mechanism capable of transmitting driving force for a first turnable holder and a second turnable holder.

The first turnable holder 53 may be a rotary tool unit holder for plural rotary tool units TU1 (FIG. 3). The first turnable holder 53 may be turnably mounted on the base body 521 and the first bottom support 56. The first turnable holder 53 may turn on a first turning axis B1. Specifically, the upper end of the first turnable holder 53 may be turnably supported by the base body 521. The lower end of the first turnable holder 53 may be turnably supported by the first bottom support 56. Removing the first bottom support 56 from the movable table 51 may allow the first turnable holder 53 to be detachable with respect to the base body 521. The turning drive transmission mechanism 55 (FIG. 3) may transmit driving force of the turning motor 523 to the upper end of the first turnable holder 53, thus enabling the first turnable holder 53 to turn on the first turning axis B1. The first turning axis B1 may be perpendicular to the spindle axis CL1 (FIG. 1) and extend in the Y1-axis direction. The first turnable holder 53 may have four first tool unit mounting parts 53a where the rotary tool units TU1 are detachably attached. The number of the first tool mounting parts 53a may be three or less or five or more. The first turnable holder 53 may have another mounting parts where turning tools are detachably attached. The first tool unit mounting parts 53*a* may be an example of the first tool mounting part. The four first tool unit mounting parts 53*a* may be formed in the Y1-axis direction on the first turnable holder 53. As shown in FIG. 3, the rotary tool units TU1 each may be attached to the first tool unit mounting parts 53*a* each. The rotary tool unit TU1 may include a rotary tool T1*a* protruding to one side and another rotary tool T1*b* protruding to the other side. The rotary tool T1*a* and the rotary tool T1*b* each may be an example of the tool. Another tool unit including a thread whirling tool may be attached to the first tool unit mounting part 53*a*. The first turnable holder 53 may include a tool rotating mechanism connected to the rotary drive transmission mechanism of the base body 521 to receive driving force therefrom. The tool rotating mechanism may transmit the driving force to the four rotary tool units TU1 each to rotate the rotary tools T1*a* and T1*b*.

The second turnable holder 54 may be a thread whirling holder for a thread whirling tool TT2 (FIG. 3). The second turnable holder 54 may be turnably mounted on the turnable base 52. The second turnable holder 54 may turn on a second turning axis B2. Specifically, the upper end of the second turnable holder 54 may be turnably supported by the base body 521. More specifically, the upper end of the second turnable holder 54 may be fastened to the lower end of a transmission shaft 5521 (FIG. 3) with screws. Removing the screws may allow the second turnable holder 54 to be detachable with respect to the transmission shaft 5521. The turning drive transmission mechanism 55 (FIG. 3) may transmit driving force of the turning motor 523 to the upper end of the second turnable holder 54, thus enabling the second turnable holder 54 to turn on the second turning axis B2. The second turning axis B2 may be perpendicular to the spindle axis CL1 (FIG. 1). The second turning axis B2 may be distant from the first turning axis B1 in the X1-axis direction. The second turning axis B2 may be preferably parallel to the first turning axis B1, thus simplifying the configuration of the turning drive transmission mechanism 55. The second turnable holder 54 may have a second whirling tool mounting part 54*a* where the thread whirling tool TT2 is detachably attached. The thread whirling tool TT2 may be an example of the tool. The second whirling tool mounting part 54*a* may be an example of the second tool mounting part. The second turnable holder 54 may include a whirling rotating mechanism connected to the rotary drive transmission mechanism of the base body 521 to receive driving force therefrom. The whirling rotating mechanism may transmit the driving force to rotate the thread whirling tool TT2.

FIG. 3 is a right side view of the turning drive transmission mechanism capable of transmitting driving force to turn the first turnable holder 53 and the second turnable holder 54. The guide bush 4 and the workpiece W are shown. The four rotary tool units TU1 are attached to the first turnable holder 53. The thread whirling tool TT2 is attached to the second turnable holder 54.

The first turnable holder 53 and the second turnable holder 54 may be arranged on opposite sides of the workpiece W as shown in FIG. 3. The spindle axis CL1 may be at the center of the workpiece W. The first turnable holder 53 and the second turnable holder 54 may be on opposite sides of the spindle axis CL1. The workpiece W and the spindle axis CL1 may extend in the direction perpendicular to paper. The turning drive transmission mechanism 55 may transmit driving force to turn the first turnable holder 53 and the second turnable holder 54. The turning drive transmission mechanism 55 may include a first drive connection mechanism 551, a second drive connection mechanism 552, a first pulley 553, a second pulley 554, a belt 555, and a brake 556, which may be all disposed inside the base body 521. The first drive connection mechanism 551 may be secured to the base body 521. The first drive connection mechanism 551 may include a rotatable transmission shaft. The transmission shaft may be connected to an output shaft 5232 of the reducer 5231. The first drive connection mechanism 551 may transmit driving force of the turning motor 523 to turn the first turnable holder 53. Such mechanism is known as disclosed in Japanese Unexamined Patent Application Publication No. 2014-037043. The first turnable holder 53 may turn on the first turning axis B1 by up to 135 degrees. The output shaft 5232 of the reducer 5231 may have a central axis coaxial with the first turning axis B1. FIG. 3 shows the state that the first turnable holder 53 is at a reference turning angle, which means that the first turnable holder 53 does not turn. The rotary tools T1*a* and T1*b* each may project in the X1-axis direction. The second drive connection mechanism 552 may be secured to the base body 521. The second drive connection mechanism 552 may be similar to the first drive connection mechanism 551 except that the transmission shaft 5521 projects outwards. The second drive connection mechanism 552 may transmit driving force of the turning motor 523 to the second turnable holder 54. The first drive connection mechanism 551 and the second drive connection mechanism 552 may be similar in configuration, enabling the turnable holders to be replaced to each other.

The first pulley 553 may be arranged between the reducer 5231 and the first drive connection mechanism 551 and secured to the output shaft 5232 of the reducer 5231. The second pulley 554 may be fastened to the projected part of the transmission shaft 5521 of the second drive connection mechanism 552. The second pulley 554 may be twice as large as the first pulley 553 in diameter. The transmission shaft 5521 may extend in the Y1-axis direction to receive driving force from the turning motor 523 through the second pulley 554 for transmission to the second turnable holder 54. The transmission shaft 5521 may have a central axis coaxial with the second turning axis B2. The lower end of the transmission shaft 5521 may be coupled to the upper end of the second turnable holder 54. The upper end of the transmission shaft 5521 may include a disc rotor 5561 mounted thereon. The belt 555 may be wound on the first pulley 553 and the second pulley 554 to transmit rotation of the output shaft 5232 to the transmission shaft 5521. Driving the turning motor 523 may synchronously turn the first turnable holder 53 and the second turnable holder 54. Difference of the first pulley 553 and the second pulley 554 in diameter may rotate the transmission shaft 5521 only by half of the angle that the output shaft 5232 rotate. FIG. 3 shows the second turnable holder 54 at the reference turning angle. The thread whirling tool TT2 may have a through-hole for the workpiece W. The through-hole may extend in the Z1-axis direction.

The brake 556 may include the disc rotor 5561 and a caliper 5562 including brake pads. The control apparatus 2 (FIG. 1) may send a command to pinch the disc rotor 5561 with the brake pads to maintain the second turnable holder 54 at a predetermined angle by which the holder 54 has turned.

Figure 4:
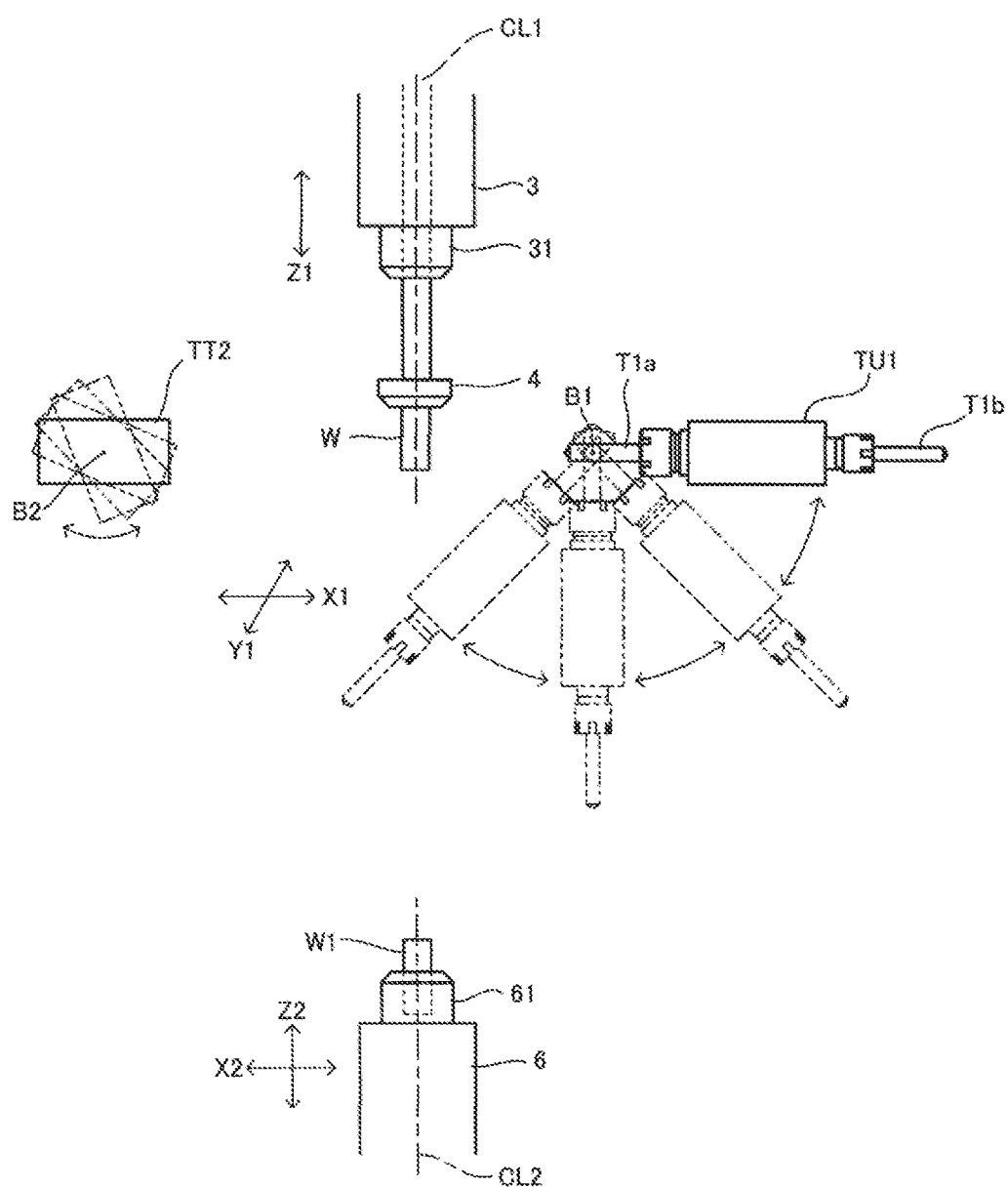
FIG. 4 is a plan view showing a direction of a tool attached to the first turnable holder and the second turnable holder each that has turned by a predetermined angle.

FIG. 4 is a plan view showing an orientation of the tool of the first turnable holder 53 and the second turnable holder 54. The rotary tool unit TU1 shown by a solid line represents the state that the first turnable holder 53 stays at the reference turning angle. The thread whirling tool TT2 shown by a solid line represents the state that the second turnable holder 54 stays at the reference turning angle. The rotary tool unit TU1 shown by a two-dash line represents the state that the first turnable holder 53 turns by an angle. The thread whirling tool TT2 shown by a two-dash line represents the state that the second turnable holder 54 turns by an angle.

Driving the first turnable holder 53 may turn the rotary tool unit TU1 on the first turning axis B1. The first turning axis B1 and the second turning axis B2 may be perpendicular to paper. FIG. 4 shows the three rotary tool units TU1 each that has turned by 45 degrees each in a two-dash line. Movement of the tool post 5 (FIG. 1) in the Y1-axis direction enables selection of desired one of the rotary tool units TU1. The first turnable holder 53 may be at the reference turning angle (0 degree). Then, movement of the tool post 5 in the X1-axis direction may enable the rotary tool T1a to apply a cross hole machining on the workpiece W supported by the guide bush 4. The first turnable holder 53 may be at a turning angle other than 0 degree or 90 degrees to assume an angled position with respect to the workpiece W. Then, movement of the tool post 5 in the X1-axis direction and synchronous movement of the headstock 3 in the Z1-axis direction may enable the rotary tool T1a to apply an oblique hole machining on the workpiece W supported by the guide bush 4. The first turnable holder 53 may be at a turning angle of 90 degrees. Then, movement of the headstock 3 in the Z1-axis direction may enable the rotary tool T1a to apply a hole machining on the end of the workpiece W.

Driving the second turnable holder 54 may turn the thread whirling tool TT2 on the second turning axis B2. FIG. 4 shows the three thread whirling tools TT2 each that has turned by 22.5 degrees each in a two-dash line. Thread whirling on the workpiece W may be available by bringing the through-hole of the thread whirling tool TT2 in a position facing the workpiece W, turning the tool TT2 according to a target lead angle of a screw, and rotating the spindle 31 and the tool TT2 and moving the headstock 3 in the Z1-axis direction.

The rotary tool T1b on the other side may apply on the cut-off workpiece W1 held by the opposite spindle 61. Movement of the tool post 5 (FIG. 1) in the Y-axis direction may select a desired one of the plural rotary tool units TU1. Movement of the opposite headstock 6 in the X2-axis direction may bring the opposite spindle 61 to a position facing the rotary tool T1b of the selected rotary tool unit TU1. The first turnable holder 53 may be at a turning angle of 90 degrees. Then, movement of the opposite headstock 6 in the Z2-axis direction may enable the rotary tool T1b to apply a hole machining on the end of the workpiece W1. The first turnable holder 53 may be at a turning angle other than 0 degree or 90 degrees to assume an angled position with respect to the workpiece W. Then, one of the movement of the tool post 5 in the X1-axis direction and the movement of the opposite headstock 6 in the X2-axis direction and synchronous movement of the opposite headstock 6 in the Z2-axis direction may enable the rotary tool T1b to apply an oblique hole machining on the workpiece W1 held by the opposite spindle 61.

In the NC lathe as described above, the tool post may include the first turnable holder 53 and the second turnable holder 54. Such configuration provides a variety of operations by use of multiple tools whose cutting edges facing in desired directions. Such configuration also saves a turning space compared to a single larger turnable holder having both the four first tool unit mounting parts 53a and the second whirling tool mounting part 54a. Even a sum of a space required for turning the first turnable holder 53 and a space required for turning the second turnable holder 54 would be smaller than a space required for the comparative single turnable holder, thus reducing the machine tool in size. Furthermore, the turning motor 523 may commonly drive the first turnable holder 53 and the second turnable holder 54, thus reducing the number of motors and reducing the machine tool in cost. Furthermore, the brake 556 may keep the turning angle of the second turnable holder 54 regardless of any load applied in the turning direction, thus providing higher machining accuracy by use of the thread whirling tool TT2 attached to the second turnable holder 54.

A modified embodiment of the tool post 5 is being described. The same element that has been described is being referred by the same symbol and the description thereof is being omitted as the case may be.

Figure 5:
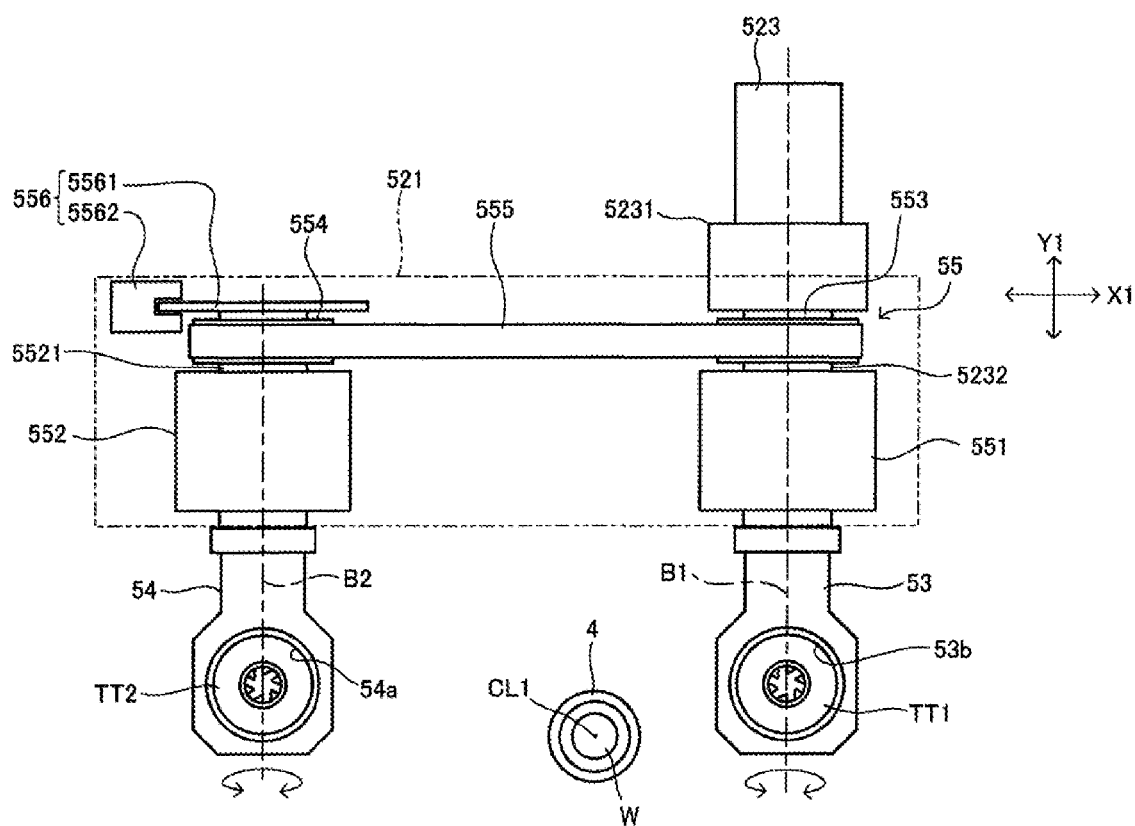
FIG. 5 is a right side view similar to FIG. 3 showing a tool post of a first modified embodiment.

FIG. 5 is a right side view similar to FIG. 3 showing the tool post of the first modified embodiment.

The tool post 5 of the first modified embodiment in FIG. 5 may differ from the tool post 5 in FIG. 2 in that the second pulley 554 may be the same as the first pulley 553 in diameter. The first turnable holder 53 and the second turnable holder 54 may thereby synchronously turn by the same turning angle. The tool post 5 in FIG. 5 may further differ from the tool post 5 in FIG. 2 in that the first turnable holder 53 may be a thread whirling holder. The first turnable holder 53 may be the same as the second turnable holder 54 in configuration. The first turnable holder 53 may have a first whirling tool mounting part 53b where a thread whirling tool TT1 is attachable. The thread whirling tool TT1 may be an example of the tool. The first whirling tool mounting part 53b may be an example of the first tool mounting part. The first turnable holder 53 may be turnably mounted on the base body 521 on the first turning axis B1. The upper end of the first turnable holder 53 may be fastened to the lower end of the output shaft 5232 with screws. Removing the screws may allow the first turnable holder 53 to be detachable from the output shaft 5232.

The first modified embodiment has the same effects as the embodiment. The first turnable holder 53 and the second turnable holder 54 each may be configured to hold the thread whirling tool TT1 and the thread whirling tool TT2 each, thus providing a variety of thread whirling operations applicable on the workpiece W held by the spindle 31 such as a single-start thread, a double-start thread, and two different threads of different ridges.

Figure 6:
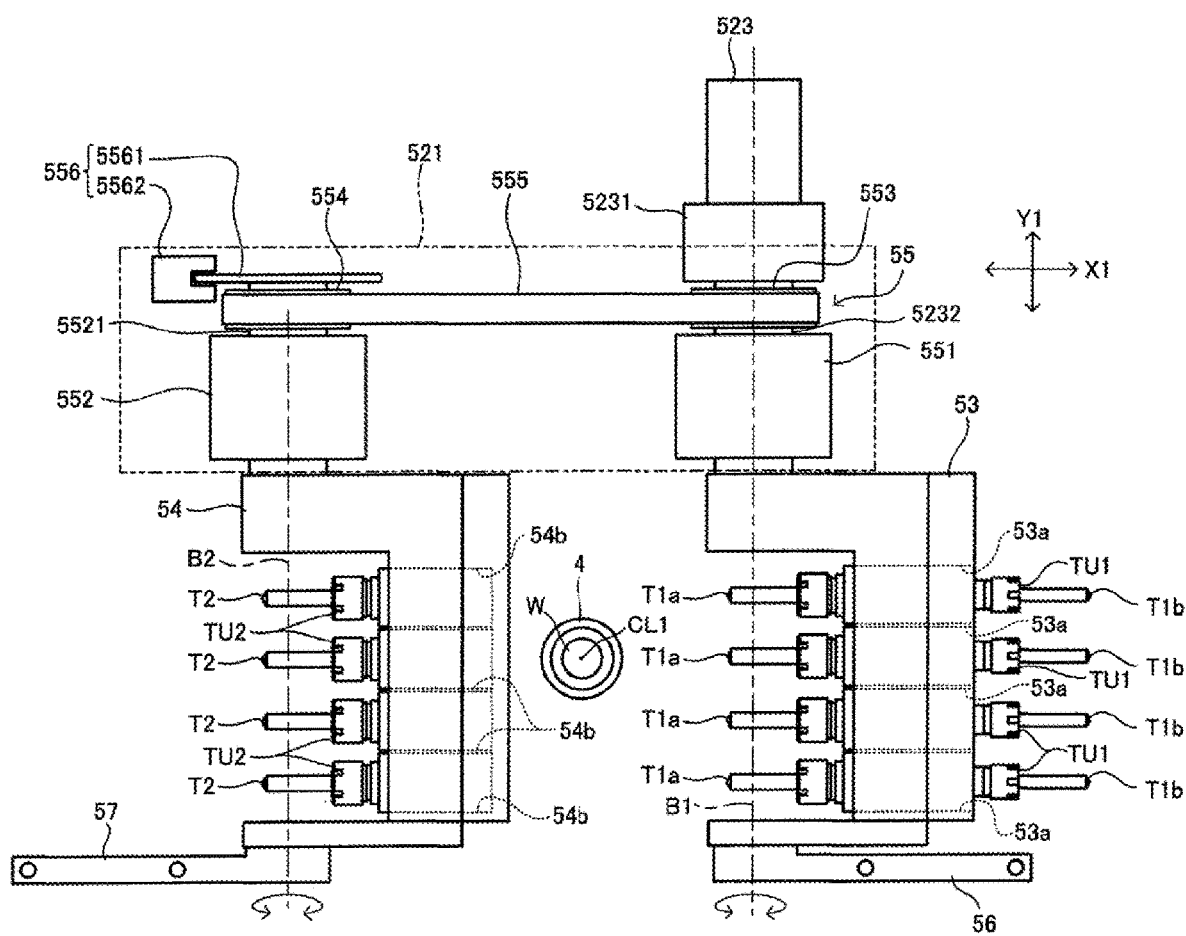
FIG. 6 is a right side view similar to FIG. 3 showing a tool post of a second modified embodiment.

FIG. 6 is a right side view similar to FIG. 3 showing the tool post of the second modified embodiment.

The tool post 5 of the second modified embodiment in FIG. 6 may differ from the tool post 5 in FIG. 2 in that the second pulley 554 may be the same as the first pulley 553 in diameter. The first turnable holder 53 and the second turnable holder 54 may thereby synchronously turn by the same turning angle. The tool post 5 in FIG. 6 may further differ from the tool post 5 in FIG. 2 in that the second turnable holder 54 may be a rotary tool unit holder configured to hold the plural rotary tool units TU2. The second modified embodiment may further include a second lower end support 57. The second turnable holder 54 may be the same as the first turnable holder 53 in configuration except the structure of a second tool unit mounting part 54b. The second tool unit mounting part 54b may be closed on the right side as seen in FIG. 6. The rotary tool unit TU2 attachable to the second tool unit mounting part 54b may be a rotary tool T2 projecting to one side. The rotary tool T2 may be an example of the tool. The second tool unit mounting part 54b may be an example of the second tool mounting part. The second turnable holder 54 may be exactly the same as the first turnable holder 53 in configuration, thus reducing the number of parts and thereby reducing the NC lathe 1 in cost. The first turnable holder 53 may be configured to replace the rotary tool unit TU1 with the rotary tool unit TU2. The second turnable holder 54 may be configured to replace the rotary tool unit TU2 with the rotary tool unit TU1.

The second turnable holder 54 may be mounted on the base body 521 turnably on the second turning axis B2. The lower end of the second turnable holder 54 may be turnably supported by the second lower end support 57. The second lower end support 57 may be below the base body 521 and fastened to the movable table 51 (FIG. 2) with screws. The second lower end support 57 may be excluded. The second lower end support 57, however, may serve as a rigid support for the second turnable holder 54, thus preventing a bend of the second turnable holder 54 and thereby providing a higher machining accuracy. Removing the second lower end support 57 from the movable table 51 may allow the second turnable holder 54 to be detachable with respect to the base body 521. The second modified embodiment has the same effect of the embodiment.

Figure 7:
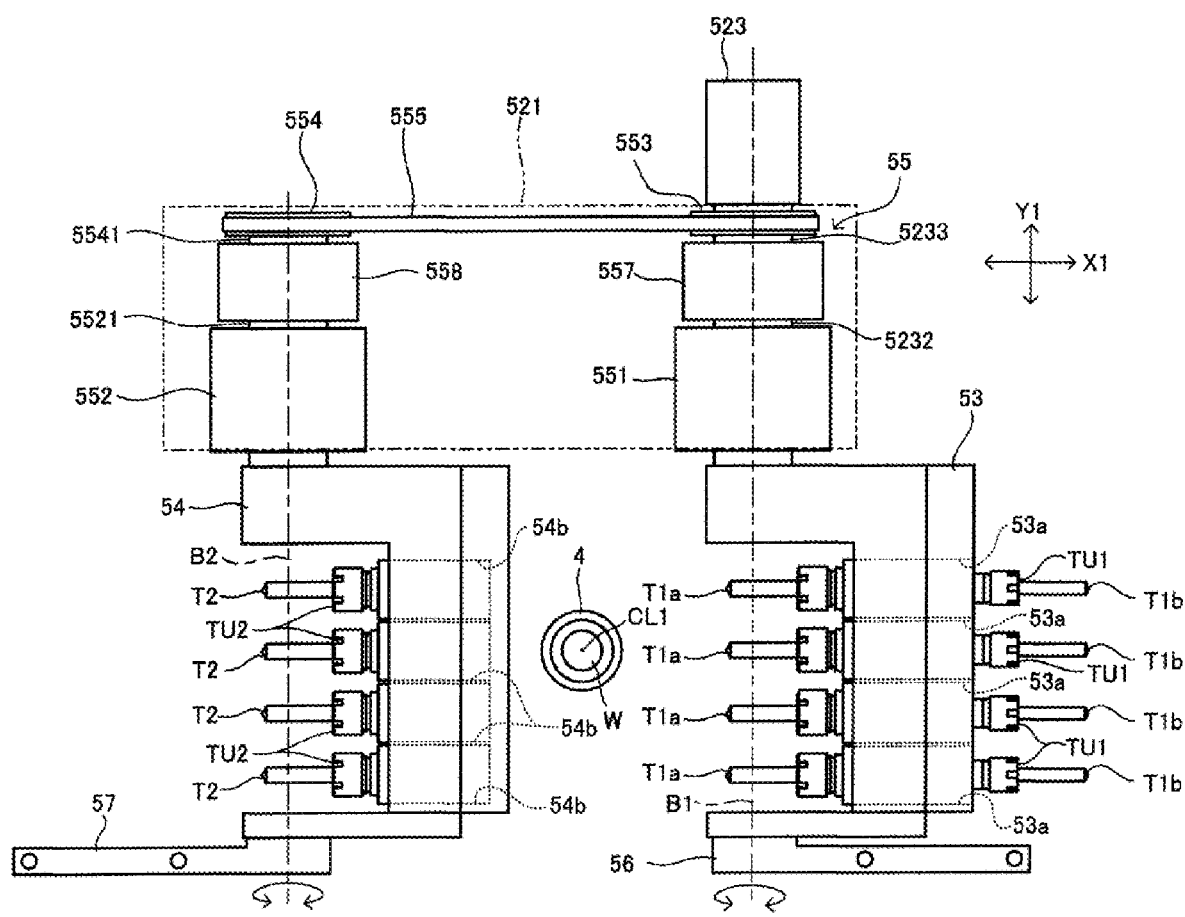
FIG. 7 is a right side view similar to FIG. 3 showing a tool post of a third modified embodiment.

FIG. 7 is a right side view similar to FIG. 3 showing the tool post of the third modified embodiment. Difference from the second modified embodiment is being described.

The tool post 5 in the third modified embodiment in FIG. 7 may differ from the tool post 5 in the second modified embodiment in FIG. 6 in that the reducer 5231 may be replaced by a first reducer 557 and a second reducer 558. Furthermore, the brake 556 may be excluded. Furthermore, the first pulley 553 may be secured to the output shaft 5233 of the turning motor 523 and the second pulley 554 may be secured to an input shaft 5541 of the second reducer 558. The first reducer 557 may be disposed between the first drive connection mechanism 551 and the first pulley 553. The second reducer 558 may be disposed between the second drive connection mechanism 552 and the second pulley 554.

Any load applied to the second turnable holder 54 in the turning direction may be transmitted to the second reducer 558 internally including a speed reducing mechanism. Further transmission of the load to the second pulley 554 may be thereby suppressed, thus facilitating maintenance of the turning angle of the second turnable holder 54 without the brake 558. The speed reducing mechanism may be a worm gear of smaller lead angle, thus surely preventing the second turnable holder 54 from turning in response to the load applied thereto. The first reducer 557 and the second reducer 558 may have the same reduction ratio. The first turnable holder 53 and the second turnable holder 54 may then turn by the same turning angle. Reduction ratio may be different. The third modified embodiment has the same effects as the embodiment.

The invention may be embodied in a variety of modifications within a range of the claims. The invention may be embodied in a machining center or another machine tool. Another tool post may be provided for the opposite spindle 61. Another brake may be provided between the turning motor 523 and the first turnable holder 53 to keep the turning angle of the first turnable holder 53. Another turning motor 523 may be added to separately drive the first turnable holder 53 and the second turnable holder 54. The control apparatus 2 may separately control the two motors 523 to differently turn the first turnable holder 53 and the second turnable holder 54. The tool post 5 may include three or more turnable holders. The single turning motor 523 may commonly drive the at least two of the turnable holders. The single turning motor 523 may commonly drive all the turnable holders.

Any element included only in the specific embodiment as described above may be applied to any other modification.

What is claimed is:

1. A machine tool comprising:
a spindle capable of holding a workpiece and rotatable on a spindle axis; and
a tool post on which a tool is attachable, the tool being capable of machining the workpiece held by the spindle;
the tool post further comprising:
a first turnable holder turnable on a first turning axis perpendicular to the spindle axis, the first turnable holder having a first tool mounting part where the tool is attachable,
a second turnable holder turnable on a second turning axis perpendicular to the spindle axis and different from the first turning axis, the second turnable holder having a second tool mounting part where the tool is attachable, and
a motor configured to commonly drive the first turnable holder and the second turnable holder.

2. The machine tool of claim 1 further comprising a turning drive transmission mechanism configured to transmit the driving force of the motor from an upper end of the first turnable holder to an upper end of the second turnable holder.

3. The machine tool of claim 1 further comprising a brake configured to maintain the second turnable holder at a predetermined turning angle by which the second turnable holder has turned.

4. The machine tool of claim 2 further comprising a brake configured to maintain the second turnable holder at a predetermined turning angle by which the second turnable holder has turned.

5. The machine tool of claim 1, wherein a thread whirling tool is attachable to the first turnable holder and the second turnable holder each.

6. The machine tool of claim 2, wherein a thread whirling tool is attachable to the first turnable holder and the second turnable holder each.

7. The machine tool of claim 3, wherein a thread whirling tool is attachable to the first turnable holder and the second turnable holder each.

8. The machine tool of claim 4, wherein a thread whirling tool is attachable to the first turnable holder and the second turnable holder each.

* * * * *